US012785596B2

(12) United States Patent
van Booven et al.

(10) Patent No.: US 12,785,596 B2
(45) Date of Patent: Nov. 3, 2026

(54) METHOD FOR NOISE REDUCTION DURING OPERATION OF AN ELECTRIC MOTOR, AND MOTOR CONTROL DEVICE FOR CONTROLLING THE OPERATION OF AN ELECTRIC MOTOR INVOLVING NOISE REDUCTION

(71) Applicant: Vitesco Technologies GmbH, Regensburg (DE)

(72) Inventors: Benedikt van Booven, Regensburg (DE); Markus Feulner, Ensdorf (DE); Rainer Weber, Regensburg (DE); Moritz Märgner, Berlin (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 247 days.

(21) Appl. No.: 18/712,967

(22) PCT Filed: Nov. 22, 2022

(86) PCT No.: PCT/EP2022/082724
§ 371 (c)(1),
(2) Date: May 23, 2024

(87) PCT Pub. No.: WO2023/094352
PCT Pub. Date: Jun. 1, 2023

(65) Prior Publication Data

US 2025/0030361 A1 Jan. 23, 2025

(30) Foreign Application Priority Data

Nov. 25, 2021 (DE) ..................... 10 2021 213 271.5

(51) Int. Cl.
*H02P 21/00* (2016.01)
*H02P 21/05* (2006.01)
(Continued)

(52) U.S. Cl.
CPC .............. *H02P 21/05* (2013.01); *H02P 21/18* (2016.02); *H02P 21/22* (2016.02)

(58) Field of Classification Search
CPC .......... H02P 21/05; H02P 21/22; H02P 21/18; H02P 29/50; H02P 21/0025; H02P 23/04; H02P 6/08; H02P 6/10
See application file for complete search history.

(56) References Cited

U.S. PATENT DOCUMENTS 10,830,166 B2 11/2020 Serrano et al.
2009/0251096 A1 10/2009 Schulz
(Continued)

FOREIGN PATENT DOCUMENTS

DE 102009000930 A1 12/2009
DE 102018202967 A1 8/2019
(Continued)

OTHER PUBLICATIONS

Search Report for International Application No. PCT/EP2022/082724, 12 pages, Feb. 24, 2023.
(Continued)

*Primary Examiner* — Karen Masih
(74) *Attorney, Agent, or Firm* — Slayden Grubert Beard PLLC

(57) ABSTRACT

Various embodiments of the teachings herein include a method for noise reduction during operation of an electric motor. The method may include: determining an instantaneous rotational frequency of the electric motor from a signal representing a rotational position and/or a rotational speed of the electric motor; filtering a frequency component from the signal, the frequency component corresponding to the instantaneous rotational frequency of the electric motor multiplied by a specified factor greater than 1 and lying within a specified acoustic frequency range; and generating
(Continued)

a correction signal based on the filtered signal and feeding this correction signal into the control loop so an amplitude of the interference signal is reduced.

10 Claims, 3 Drawing Sheets

(51) Int. Cl.
*H02P 21/18* (2016.01)
*H02P 21/22* (2016.01)

(56) References Cited

U.S. PATENT DOCUMENTS

| | | | |
|---|---|---|---|
| 2019/0020297 | A1 | 1/2019 | Pop et al. |
| 2019/0199178 | A1 | 6/2019 | Kuhn et al. |
| 2020/0343779 | A1 | 10/2020 | Lahr et al. |
| 2021/0184520 | A1 | 6/2021 | Zhang et al. |

FOREIGN PATENT DOCUMENTS

| | | | | |
|---|---|---|---|---|
| EP | 3294610 | B1 | 7/2019 | |
| JP | 6551297 | B2 | 7/2019 | |
| JP | 2021097512 | A | 6/2021 | |
| WO | WO-2021033489 | A1 * | 2/2021 | H02P 27/08 |

OTHER PUBLICATIONS

1st Office Action for DE Application No. 10 2021 213 271.5, 5 pages, Oct. 28, 2022.

2nd Office Action for DE Application No. 10 2021 213 271.5, 7 pages, Mar. 15, 2023.

Feng, Guodong; Lai, Chunyan; Kar, Narayan C.: A closed-loop fuzzy-logic-based current controller for PMSM torque ripple minimization using the magnitude of speed harmonic as the feedback control signal. In: IEEE Transactions on Industrial Electronics, vol. 64, 2017, No. 4, S. 2642-2653. ISSN 1557-9948 (E); 0278-0046 (P). DOI: 10.1109/TIE.2016.2631524.

* cited by examiner

METHOD FOR NOISE REDUCTION DURING OPERATION OF AN ELECTRIC MOTOR, AND MOTOR CONTROL DEVICE FOR CONTROLLING THE OPERATION OF AN ELECTRIC MOTOR INVOLVING NOISE REDUCTION

CROSS-REFERENCE TO RELATED APPLICATIONS

This application is a U.S. National Stage Application of International Application No. PCT/EP2022/082724 filed Nov. 22, 2022, which designates the United States of America, and claims priority to DE Application No. 10 2021 213 271.5 filed Nov. 25, 2021, the contents of which are hereby incorporated by reference in their entirety.

TECHNICAL FIELD

The present disclosure relates to noise reduction. Various embodiments of the teachings herein include systems and/or methods for noise reductions during operation of an electric motor.

BACKGROUND

Some example methods for reducing noise during operation of an electric motor by means of a motor control are known, for example, from the publications DE 10 2014 007 502 A1 and DE 10 2018 115 148 A1. During operation of the electric motor, the motor control controls in a control loop at least one actual value of at least one control variable (e.g., torque, speed, etc.) determining a rotary drive of the electric motor to at least one corresponding setpoint value of the respective control variable supplied to the motor control.

In the above-mentioned references, noise reduction is based to a certain extent on the targeted generation of additional noise by the electric motor, which is then superimposed like “anti-noise” on the noise already generated during operation of the electric motor and causes noise reduction through destructive interference. This requires a measurement of the generated noise in the vicinity of the electric motor by means of a measuring device, for example a microphone for airborne noise detection or an acceleration sensor for the detection of structure-borne noise. Based on the result of this noise measurement, a correction signal is generated in a suitable manner and fed into the motor control loop (feedback).

SUMMARY

Teachings of the present disclosure demonstrate a different way of achieving noise reduction in the operation of an electric motor. For example, some embodiments of the teachings herein include a method for noise reduction during operation of an electric motor (M) by means of a motor control, wherein the motor control controls in a control loop (10, 20, 30, 40, 50) at least one actual value (Iqact, Idact) of at least one control variable (Iq, Id) determining a rotary drive of the electric motor (M) to at least one corresponding setpoint value (Iqsp, Idsp) of the respective control variable (Iq, Id) supplied to the motor control, characterized in that the method for noise reduction comprises: a) determining an instantaneous rotational frequency (f) of the electric motor (M) from a signal representative of a rotational position (φ) and/or a rotational speed of the electric motor (M) and hereinafter referred to as a rotation signal (Srot), b) filtering at least one frequency component, hereinafter referred to as an interference signal (Srot-1, Srot-2, . . . ), from the rotation signal (Srot), the frequency of which corresponds to the instantaneous rotational frequency (f) of the electric motor (M) multiplied by a specified factor (N1, N2, . . . ) greater than 1 and which at the same time lies within a specified acoustic frequency range, and c) generating a correction signal (Idh, Iqh) based on the at least one interference signal (Srot-1, Srot-2, . . . ) and feeding this correction signal (Idh, Iqh) into the control loop (10, 20, 30, 40, 50) of the motor control in such a way that an amplitude of the at least one interference signal (Srot-1, Srot-2, . . . ) is reduced.

In some embodiments, the frequency of the interference signal (Srot-1, Srot-2, . . . ) corresponds to a respectively specified integer multiple (N1xf, N2xf, . . . ) of the instantaneous rotational frequency (f) of the electric motor (M).

In some embodiments, the control variable (Iq, Id) determining the rotary drive of the electric motor (M) determines a torque of the electric motor (M).

In some embodiments, the motor control is realized as a field-oriented vector control and comprises: Clarke-Parks transformation of phase currents (Iu, Iv, Iw) detected at the electric motor (M) into the actual values (Iqact, Idact) of the control variables (Iq, Id) determining the rotary drive of the electric motor (M), comparing the actual values (Iqact, Idact) of the aforementioned control variables (Iq, Id) with the corresponding setpoint values (Iqsp, Idsp) of the respective control variables (Iq, Id) fed to the motor control, generating control signals (Idctl, Iqctl) based on the result of the comparison of the stated actual values (Iqact, Idact) with the stated setpoint values (Iqsp, Idsp), Inverse Clarke transformation of the control signals (Idctl, Iqctl) into control signals (α, β) in a stationary coordinate system, space vector modulation based on the control signals (α, β) in the stationary coordinate system to generate PWM phase current control signals (Cu, Cv, Cw) for generating the phase currents (Iu, Iv, Iw) to be output to the electric motor (M), and wherein the correction signal (Idh, Iqh) generated on the basis of the at least one interference signal (Srot-1, Srot-2, . . . ) is fed into the control loop (10, 20, 30, 40, 50) in such a way that the control signals (Idctl, Iqctl) are corrected.

In some embodiments, the rotation signal (Srot) used in a) is obtained by means of a rotation position sensor (4) arranged on the electric motor (M).

In some embodiments, in b) a lower limit of the specified acoustic frequency range is at least 20 Hz, in particular at least 50 Hz, and/or an upper limit of the specified acoustic frequency range is at most 20 KHz, in particular at most 15 KHz.

In some embodiments, in b) a number of interference signals (Srot-1, Srot-2, . . . ) and/or the frequencies (N1xf, N2xf, . . . ) of the interference signals (Srot-1, Srot-2, . . . ) are specified as a function of at least one instantaneous operating parameter (Tq, Sp, Udc, T) of the operation of the electric motor (M).

In some embodiments, in b) the frequencies (N1xf, N2xf, . . . ) of the interference signals (Srot-1, Srot-2, . . . ) are each specified as at least 3 times, in particular at least 5 times, the instantaneous rotational frequency (f) of the electric motor (M) and/or are each specified as at most 100 times, in particular at most 80 times, the instantaneous rotational frequency (f) of the electric motor (M).

In some embodiments, in c) the respective correction signal (Idh, Iqh) is generated based on the at least one interference signal (Srot-1, Srot-2, . . . ) in such a way that the amplitude of the respective interference signal (Srot-1, Srot-2, . . . ) is reduced to a respective specified noise reduction setpoint.

In some embodiments, the noise reduction setpoint value is specified as a function of at least one instantaneous operating parameter (Tq, Sp, Udc, T) of the operation of the electric motor (M).

As another example, some embodiments include a motor control device (1) for controlling the operation of an electric motor (M) using a noise reduction method as described herein, said device comprising: a control circuit with means (10, 20, 30, 40, 50) for controlling at least one actual value (Iqact, Idact) of at least one control variable (Iq, Id) determining a rotary drive of the electric motor (M) to at least one corresponding setpoint value (Iqsp, Idsp) of the respective control variable (Iq, Id) supplied to the motor control device (1), characterized in that the motor control device (1) further comprises: a determination device (69) for determining an instantaneous rotational frequency (f) of the electric motor (M) from a signal representative of a rotational position (φ) and/or a rotational speed (dφ/dt) of the electric motor (M) and hereinafter referred to as a rotation signal (Srot), a filter device (65) for filtering at least one frequency component, hereinafter referred to as an interference signal (Srot-1, Srot-2, . . . ), from the rotation signal (Srot), the frequency of which corresponds to the instantaneous rotational frequency (f) of the electric motor (M) multiplied by a specified factor (N1, N2, . . . ) greater than 1 and which at the same time lies within a specified acoustic frequency range, and a correction signal generating device (60) for generating a correction signal (Idh, Iqh) based on the at least one interference signal (Srot-1, Srot-2, . . . ) and feeding this correction signal (Idh, Iqh) into the control loop (10, 20, 30, 40, 50) in such a way that an amplitude of the at least one interference signal (Srot-1, Srot-2, . . . ) is reduced.

As another example, some embodiments include use of a method and/or a motor control device (1) as described herein for controlling the operation of an electric motor (M) used in a vehicle for a drive of the vehicle with noise reduction.

As another example, some embodiments include a computer program product comprising a program code that, when executed on a data processing device, performs one or more of the methods described herein.

BRIEF DESCRIPTION OF THE DRAWINGS

The teachings of the present disclosure are described in more detail below on the basis of exemplary embodiments with reference to the accompanying drawings, in which, in each case schematically.

DETAILED DESCRIPTION

Figure 1:
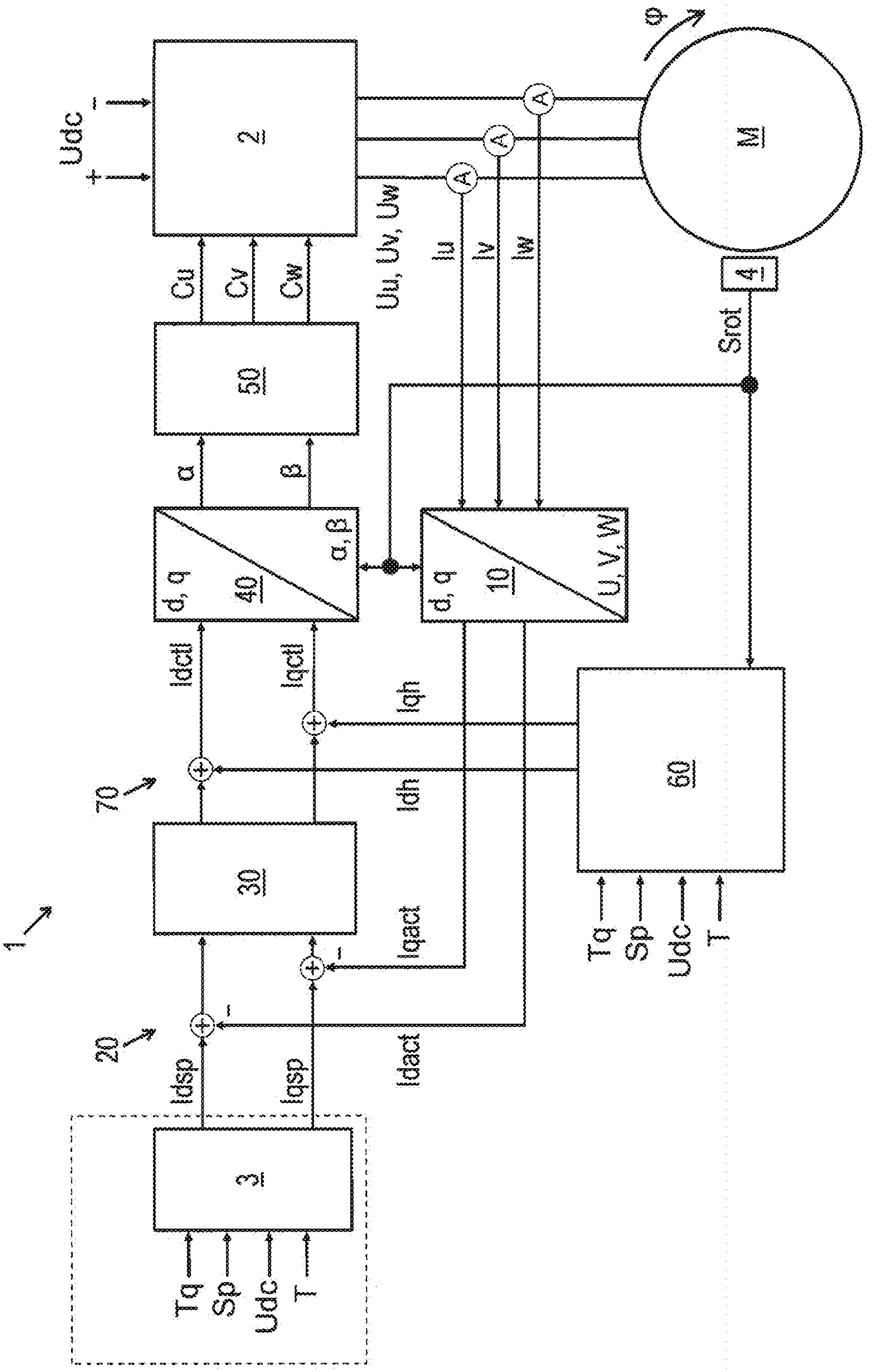
FIG. 1 shows a block diagram of a motor control device incorporating teachings of the present disclosure.

Teachings of the present disclosure include a motor control method comprising:

a) determining an instantaneous rotational frequency of the electric motor from a signal representative of a rotational position (e.g., angular position) and/or a rotational speed (e.g., angular speed) of the electric motor and hereinafter referred to as a rotation signal, b) filtering at least one frequency component, hereinafter referred to as an interference signal, from the rotation signal, the frequency of which corresponds to the instantaneous rotational frequency of the electric motor multiplied by a specified factor greater than 1 and which at the same time lies within a specified acoustic frequency range (e.g., 50 Hz to 16 kHz), and c) generating a correction signal based on the at least one interference signal and feeding this correction signal into the control loop of the motor control in such a way that an amplitude of the at least one interference signal is reduced.

The factor by which the frequency of the or each of the interference signals filtered from the rotation signal in step b) is greater than the instantaneous rotational frequency of the electric motor can, in particular, be, for example, at least 1.1 or, for example, at least 1.5.

In some embodiments, c) can, for example, be based on prior art from the field of generating anti-noise, in particular, for example, prior art relating to active noise cancellation (ANC). In c), it is possible, for example, to convert the (at least one) "interference signal" detected during operation of the electric motor (in each case) into a kind of antiphase version and feed it back into the control loop as the "correction signal" (or correction signal component thereof) in such a way that destructive interference is already caused in the electric motor. However, the implementation of a method incorporating teachings of the present disclosure for detecting the interference signal does not require a measuring device such as a microphone for measuring airborne sound or an acceleration sensor for measuring structure-borne sound.

Rather, by means of a) and b), an interference signal required for accomplishing active noise suppression is obtained based on the "rotation signal" representative of a rotational position and/or rotational speed of the electric motor, which is generally available anyway in the context of a motor control of the type in question here and can thus be used.

When operating electric motors, especially in dynamic applications where the torque and/or the rotational frequency (speed) can vary greatly, a wide range of influences can cause oscillations in the output torque. These oscillations or torque ripples can have their cause inside the electric motor and/or outside the electric motor, for example in a downstream gearbox. Within the electric motor, oscillations and interference noises can be caused, for example, by the occurrence of radial and tangential forces that are triggered by corresponding variations in the magnetic field in the air gap of the electric motor.

Outside the electric motor, oscillations and interference noises can be caused, for example, by the excitation of natural frequencies and the excitation of harmonics of the electric motor's rotational frequency on components of a drive train downstream of the electric motor. These components can be, for example, (at least) one gearbox and/or (at least) one rotary drive shaft in the drive train between the electric motor and a component driven by the electric motor (e.g., wheel or several wheels of a vehicle).

In some embodiments, during operation of the electric motor in a specific installation environment (e.g., drive train of a vehicle driven by means of the electric motor), the noise which would otherwise be generated by the aforementioned excitation of oscillations can be reduced. Irrespective of the specific cause of the disturbing noises, acoustically disturbing noises during operation of the electric motor are often caused by one or more oscillations of which the frequencies each correspond to a certain integer multiple of the instantaneous rotational frequency of the electric motor ("harmonics" of the rotational frequency), provided that these fall within an acoustic frequency range at the same time.

In some embodiments, the frequency of the interference signal corresponds to a specified integer multiple of the instantaneous rotational frequency of the electric motor. In this case, the "factor" mentioned above is therefore an integer greater than 1, i.e., 2 or 3 or 4, etc. Each "interference signal" filtered in this way from the rotation signal is also referred to below as a "harmonic signal", as the frequency in question in this case is a harmonic of the rotational frequency of the electric motor. During operation of the electric motor in a specific installation environment (e.g., drive train of a vehicle driven by means of the electric motor), those noises in particular which are caused by the excitation of oscillations with the frequency of certain harmonics (the rotational frequency of the electric motor) can be reduced in an even more targeted and therefore particularly energy-efficient manner.

In some embodiments, in b) several interference signals are filtered, some of which are to be designated as harmonic signal(s), whereas for another part of the interference signals the frequency(frequencies) of the interference signal(s) concerned are not integer multiples of the rotational frequency of the electric motor. The noise reduction does not require the use of an additional measuring device for sound measurement, as already mentioned. Instead, one or more specific "interference signals" (in particular one or more "harmonic signals") can be filtered out of the rotation signal and evaluated for the purpose of generating the correction signal. The correction signal is generated and fed (feedback) into the motor control loop in such a way that the amplitude of the (one) or the (several) interference signals is reduced.

In some embodiments, the control variable determining the rotary drive of the electric motor determines a torque of the electric motor. In some embodiments, the position of an accelerator pedal which can be actuated by a driver of the vehicle is detected and converted into the setpoint value of the torque to be supplied by the electric motor, whether or not other operating parameters of the electric motor and/or vehicle are also taken into account in this setpoint value specification of the torque to be supplied by the electric motor.

In some embodiments, the motor control is implemented as a so-called field-oriented vector control, whether for controlling an electric motor designed as a synchronous machine or as an asynchronous machine. With vector control, alternating variables (alternating voltages and/or alternating currents) detected during operation of the electric motor are not controlled as such in the control loop, but in each case in a mathematically transformed representation in a coordinate system (usually "d-q coordinate system") that rotates or "rotates" with the frequency of the alternating variables, corresponding to the rotational frequency of the electric motor. In the control loop, the control of the at least one actual value to the corresponding setpoint value(s) is then based on a representation of actual values and setpoint values in the rotated coordinate system.

In some embodiments, the motor control may include:

Clarke-Parks transformation of phase currents detected at the electric motor into the actual values of the control variables determining the rotary drive of the electric motor, e.g. a current component forming the magnetization current ("Id") and a current component forming the torque ("Iq"), comparison of the actual values of the aforementioned control variables with the corresponding setpoint values of the respective control variables fed to the motor control, generating control signals based on the result of the comparison of the specified actual values with the specified setpoints, e.g., by means of a "controller", Inverse Clarke transformation of the control signals into control signals in a stationary (stator-fixed) coordinate system, space vector modulation ("space vector PWM") based on the control signals in the stationary coordinate system to generate PWM phase current control signals for generating the phase currents to be output to the electric motor, wherein the correction signal generated on the basis of the at least one interference signal is fed into the control loop of the motor control in such a way that the control signals are corrected.

The generation of the control signals in the control loop based on the result of the actual value/setpoint comparison (control deviation) can be realized, for example, according to PI (proportional-integral) control. In order to feed the correction signal used for noise reduction into the control loop of the motor control, it may be advantageous to superimpose (e.g. additively superimpose) the correction signal on the control signals output by a relevant controller (e.g., PI controller).

In some embodiments, the rotation signal used in step a) is obtained by means of a rotation position sensor arranged on the electric motor. Various measurement methods are available for the specific design of such a sensor, e.g., inductive, capacitive and/or optical measurement methods, wherein a measurement method with a high bandwidth, in particular in the range of the relevant harmonics, is provided within the scope of the invention.

In some embodiments, the rotation signal used in a) is obtained by means of an inductive rotor position sensor or an optical rotor position sensor (rotation angle sensor or "resolver"). In this context, it should be noted that time-resolved information about the absolute rotor position is not always absolutely necessary for the realization of the invention. Rather, in principle, it is sufficient to have sufficiently accurate time-resolved information on the rotor speed.

In some embodiments, in b) a lower limit of the specified acoustic frequency range is at least 20 Hz, in particular at least 50 Hz. An upper limit of the specified acoustic frequency range can, for example, be a maximum of 20 KHz, in particular a maximum of 15 KHz. In one embodiment, an acoustic frequency range of approximately 50 Hz to approximately 16 kHz is provided.

When b) is carried out, one or more interference signals are filtered out of the rotation signal. Which frequencies or "factors" defining these frequencies in step b) are expediently specified for this purpose in the noise reduction depends on various circumstances of the specific use of the teachings herein. In many cases, it is advisable to specify at least one or more harmonics (integer multiples of the current rotational frequency). Such a circumstance can be, for example, the design (in particular, e.g. number of pole pairs) of the electric motor operated with the motor control, as the design can already result in a more or less pronounced generation of certain harmonics, which in this case can be taken into account in the noise reduction.

Further circumstances may arise from the installation environment of the electric motor, which is determined by the specific usage situation, with particular reference to oscillations and the resulting noise caused by (at least) one rotary shaft arranged downstream of the electric motor and/or (at least) one gearbox arranged downstream of the electric motor.

A gearbox downstream of the electric motor in the usage situation can, for example, be a gearbox with a fixed transmission or reduction ratio.

If the teachings herein are used to control an electric motor arranged in a drive train of a multi-track vehicle, such a transmission in the drive train of the vehicle can also be, for example, a distribution transmission (e.g., differential transmission), by means of which the generated rotational power is distributed to several vehicle wheels.

For each specific design of the electric motor and installation environment of the electric motor, e.g., with regard to the components in the drive train of a vehicle, empirically determined frequencies ("factors") and in particular harmonics can be taken into account in the noise reduction, for example.

In some embodiments, only one (single) harmonic is taken into account, i.e., only a single harmonic signal is extracted (filtered) from the rotation signal. This harmonic can, for example, be selected as one of the empirically determined harmonics considered to be particularly dominant or causing particularly disturbing noise.

In some embodiments, at least two different harmonics are taken into account, i.e., at least two harmonic signals are filtered from the rotation signal. The one or more harmonics can, for example, be selected as one or more of harmonics that have been empirically determined in advance as being particularly dominant or causing particularly disturbing noise.

In general, in view of the "cost/benefit ratio", it should be borne in mind that in practice it is usually sufficient to reduce the amplitudes of at most a few interference signals (including, e.g., harmonic signals) in step c), wherein the addition of further interference signals (e.g., harmonic signals) would only result in a slight advantage with a simultaneous disadvantageous increase in energy consumption for the operation of the electric motor.

In some embodiments, in b) a number of interference signals and/or the frequencies of the interference signals (possibly including one or more harmonic signals) are specified as a function of at least one instantaneous operating parameter of the operation of the electric motor. The term "number of interference signals" is to be understood in conjunction with the specification of this number as including the number "zero".

In this context, the term "frequency of an interference signal" is to be understood as equivalent to the factor by which the frequency differs from the rotational frequency—in view of the fact that this frequency also depends, strictly speaking, on the instantaneous rotational frequency of the electric motor. Accordingly, the term "frequency of a harmonic signal" is to be understood as equivalent to the "order" of the harmonics associated with the harmonic signal in question. For example, if the frequency of a harmonic signal is "18 times the rotational frequency of the electric motor", this can also be referred to as the harmonic or the harmonic signal "of the 18th order".

The "operating parameter of the operation of the electric motor" can, for example, be selected from the group consisting of the torque supplied by the electric motor, the rotational speed or rotational frequency of the electric motor, a temperature detected in the area of the electric motor (e.g., stator temperature, rotor temperature, etc.), and a combination thereof. The fact that particularly dominant or particularly disturbing noise-causing oscillations and/or underlying harmonics can also depend on such operating parameters in practice can be taken into account. In this case, this embodiment of the invention advantageously enables the most significant frequency(frequencies) or harmonic(s) to always be taken into account for noise reduction, depending on an operating state of the electric motor.

A pertinent example: with an increasing rotational frequency of the electric motor, it can be provided, for example, that up to a certain first cut-off frequency there is no noise reduction according to a), b) and c), that between the first cut-off frequency and a second cut-off frequency this noise reduction takes place based on a first "noise reduction data set" predetermined for this purpose, and that above the second cut-off frequency (and possibly up to a third cut-off frequency), this noise reduction takes place based on a second noise reduction data set predetermined for this purpose and different from the first noise reduction data set, wherein said noise reduction data sets each define at least the number of noise signals used (e.g. harmonic signals) and/or the frequencies (e.g. order(s) of harmonic signals concerned).

In some embodiments, one or more such noise reduction data sets were formed based on an empirical determination of the dependence of oscillations or noise on the rotational frequency of the electric motor carried out in advance for the relevant application situation. As an alternative or in addition to the dependence of a noise reduction data set used in the above example only on the rotational frequency of the electric motor, other operating parameters of the operation of the electric motor (e.g. torque supplied by the electric motor, or temperature detected in the area of the electric motor, etc.) can also be taken into account for the noise reduction in accordance with a), b) and c).

Furthermore, operating parameters of the operation of other components of the installation environment (e.g. vehicle or drive train of a vehicle, etc.) can also be taken into account as an alternative or in addition. In the case of the use of the invention in a vehicle, for example, it is possible to consider a vehicle speed as such an operating parameter.

In some embodiments, the number of interference signals and/or the frequencies of the interference signals are specified as a function of at least two different operating parameters (be it the operation of the electric motor and/or the operation of at least one other component). This results in an even "finer" adaptability of a noise reduction that is appropriate in terms of cost/benefit ratio. The dependency of the noise reduction data set on an operating state defined by one or more different operating parameters can be realized in the implementation of the motor control, e.g., as a corresponding (possibly multi-dimensional) map or as a corresponding "look-up table".

In some embodiments, in b) the frequencies of the interference signals (e.g., corresponding to orders of harmonic signals) are each specified as at least 3 times, in particular at least 5 times, the instantaneous rotational frequency of the electric motor and/or are each specified as at most 100 times, in particular at most 80 times, the instantaneous rotational frequency (f) of the electric motor. This range for the "factor" or, in the case of a harmonic signal, for the "order" of the (at least one) harmonic to be taken into account has proven to be particularly relevant for many applications.

A pertinent numerical example: It is assumed that the speed of the electric motor varies during operation in the range of 0-10000 rpm, corresponding to a variation in the rotational frequency of the electric motor in the range of approximately 0-167 Hz. If it is also assumed that (in step b) the acoustic frequency range is, for example, a range from 50 Hz to 16 kHz and that the noise reduction according to steps a), b) and c) only takes place if the rotational frequency of the electric motor is, for example above a "threshold (cut-off) frequency" of 300 Hz, it follows from this that only the 2nd to 53rd order should in principle be considered for noise reduction based on harmonics, since the frequencies of the 54th and even higher orders in the relevant rotational frequency range no longer fall within the specified acoustic frequency range.

In this context, it should be noted that the frequency components (interference signals) to be filtered (i.e., extracted) from the rotation signal for the realization of the invention are generally also regarded as "interference signals" in the rotor position detection that takes place there in motor controls known from the prior art, but are usually "filtered away" from the rotation signal before this rotation signal is further evaluated in order to detect the rotor position.

In some embodiments, in c) the respective correction signal is generated based on the at least one interference signal (e.g., harmonic signal) in such a way that the amplitude of the respective interference signal (e.g., harmonic signal) is reduced to a respective specified noise reduction setpoint.

Such a noise reduction setpoint can be specified as "zero", for example, if the aim in step c) is to keep the amplitude of the associated interference signal (e.g. harmonic signal) as small as possible.

Deviating from this, however, in view of the "cost/benefit ratio" already mentioned, whether generally or only in certain operating states, (at least) one noise reduction setpoint value may be specified which is different from "zero".

In some embodiments, in which (at least) one noise reduction data set of the type already described above is provided, i.e., is applied for a predetermined operating state or operating state range (e.g., in a characteristic map), the (at least one) noise reduction data set can define (at least) one noise reduction setpoint. If a noise reduction data set in b) provides for the filtering of several different frequency components, i.e., the extraction of several interfering signals, this noise reduction data set can also define several (possibly different) respective noise reduction target values, which are taken into account in the reduction of the amplitude (i.e., noise reduction) of the respective interfering signals carried out in c).

In some embodiments, the noise reduction setpoint value is specified as a function of at least one instantaneous operating parameter of the operation of the electric motor. As an alternative or in addition to the dependence of the noise reduction setpoint on at least one operating parameter of the operation of the electric motor, a dependence on at least one operating parameter of the operation of another component (the installation environment) can also be provided.

In some embodiments, the noise reduction setpoint can in particular also be provided, for example, as a function of at least one operating parameter of the operation of the vehicle (e.g. vehicle speed).

Both the motor control method and the noise reduction method envisaged here can be carried out in practice by means of a software-controlled digital computing device. In terms of circuitry, the computing device can be implemented, for example, by one or more (communicatively interconnected) control units, as these are often present in vehicles anyway, so that the realization on board a vehicle in these cases can be accomplished very cost-effectively by modifying the software used.

To implement the control loop, electrical operating parameters of the electric motor, e.g., the values of several phase currents of a multi-phase energized electric motor, as well as a rotation signal representative of the rotational position and/or rotational speed of the electric motor (whether detected by a sensor or estimated from other electrical operating parameters, for example) can be fed to the computing device in digital form. The computing device can use this to form actual values of one or more control variables that determine the rotary actuator (e.g., the torque) and compare these actual values with corresponding setpoint values that are also supplied digitally. A control deviation can be determined using an actual value-setpoint value comparison and one or more control variables can be calculated based on this. The control variables can be fed to a driver device (e.g., comprising a PWM driver), which generates electrical operating variables (voltages and/or currents) corresponding to the control variables for output to the electric motor. The specific method of controlling the actual value(s) to the corresponding setpoint(s) is defined by a control program running on the computing device. In one embodiment, the control program defines a field-oriented vector control.

To implement the noise reduction, the control program can be designed or modified accordingly in order to additionally implement a), b) and c) of the noise reduction methods explained above and, if necessary, to provide special configurations of the method.

In some embodiments, a motor control device for controlling the operation of an electric motor using a method for noise reduction of the type described herein includes a control circuit with means for controlling at least one actual value of at least one control variable determining a rotary drive of the electric motor to at least one corresponding setpoint value of the respective control variable supplied to the motor control device, wherein the motor control device further comprises: a determining device for determining an instantaneous rotational frequency of the electric motor from a signal representative of a rotational position and/or a rotational speed of the electric motor and hereinafter referred to as a rotation signal; a filtering device for filtering at least one frequency component, hereinafter referred to as a interference signal, from the rotation signal, the frequency of which corresponds to the instantaneous rotational frequency of the electric motor multiplied by a specified factor greater than 1 in each case and which at the same time lies within a specified acoustic frequency range; and a correction signal generating device for generating a correction signal based on the at least one interference signal and feeding this correction signal into the control circuit in such a way that an amplitude of the at least one interference signal is thereby reduced.

The embodiments and particular configurations described here in conjunction with the noise reduction methods described herein may analogously also be provided, individually or in any desired combination, as embodiments or particular configurations of the motor control device and vice versa.

In particular, the motor control device for example can thus be designed as a software-controlled digital computing device (e.g., one or more communicatively interconnected control devices) on which a suitable control program runs.

Furthermore, it can be provided, for example, that the (at least one) interference signal contains at least one harmonic signal.

In some embodiments, a use of a method of the type described herein and/or a motor control device of the type described herein for controlling the operation of an electric motor used in a vehicle with noise reduction is proposed, wherein the electric motor may in particular be provided for a drive of the vehicle. Furthermore, a computer program product comprising a program code is proposed which, when executed on a data processing device, e.g. a computing device provided in a vehicle, performs a method of the type described herein.

FIG. 1 shows a functional block diagram of an exemplary embodiment of a motor control device 1 incorporating teachings of the present disclosure for controlling the operation of an electric motor M, which in the example shown is designed, for example, as a three-phase synchronous machine and is arranged in a vehicle to drive said vehicle. The electric motor M is operated by a PWM driver 2 with three phase voltages Uu, Uv, Uw, which are applied to corresponding stator windings of the electric motor M by the PWM driver 2, which is supplied with an intermediate circuit voltage Udc and designed as a three-phase bridge circuit.

In the example shown, the motor control device 1 is implemented by a software-controlled computing device arranged on board the vehicle, e.g., one (or more communicatively connected) microcontroller(s) or another digital signal processing device. In this respect, the components of the motor control device 1 shown in FIG. 1 are realized or to be understood as components or functionalities of the corresponding software (control program).

The motor control device 1 has a control loop to control actual values Iqact, Idact of control variables Iq, Id, which determine a rotary drive of the electric motor M according to a field-oriented vector control, to corresponding setpoint values Iqsp, Idsp of these control variables Iq, Id. In the example, "Id" for example refers to a current component that forms a magnetizing current and "Iq" for example refers to a current component that forms a torque.

The actual values Iqact, Idact are calculated by the motor control device 1 based on the values of the phase currents Iu, Iv, Iw detected at the electric motor M (Clarke-Parks transformation).

The setpoint values Iqsp, Idsp are generated by a presetting device 3 and output to the motor control device 1. The presetting device 3 generates the values Iqsp, Idsp based on a request of a driver of the vehicle for a torque Tq to be supplied by the electric motor M, determined for example on the basis of an accelerator pedal position, wherein the values of a rotational speed specification Sp and (at least) one temperature of the electric motor M as well as the value of the DC link voltage Udc are also taken into account.

By means of a rotation position sensor 4 arranged on the electric motor M, a rotation signal "Srot" representative of a rotation angle position of the electric motor M is obtained.

The control loop of the motor control 1 is formed by:

- a first transformation device 10 for Clarke-Parks transformation of the phase currents Iu, Iv, Iw detected at the electric motor M into the corresponding actual values Iqact, Idact of the control variables Iq, Id, taking into account the rotation signal Srot,
- a comparison device 20 ("subtraction node") for comparing the actual values Iqact, Idact with the corresponding setpoint values Iqsp, Idsp,
- a controller (here: PI controller) 30 for generating control signals Idctl, Iqctl based on the result of the comparison of the actual values Iqact, Idact with the setpoint values Iqsp, Idsp,
- a second transformation device 40 for Inverse Clarke transformation of the control signals Idctl, Iqctl into control signals α, β in a stationary (stator-fixed) coordinate system in accordance with the vector control, taking into account the rotation signal Srot,
- a modulation device 50 for space vector modulation ("space vector PWM") based on the control signals α, β for generating PWM phase current control signals Cu, Cv, Cw for controlling the PWM driver 2 for generating the phase voltages Uu, Uv, Uw to be output to the electric motor M and thus the resulting phase currents Iu, Iv, Iw.

In order to achieve a noise reduction during operation of the electric motor M, the motor control device 1 has a correction signal generating device 60.

As shown in FIG. 1, the values Tq, Sp, Udc, T and the rotation signal Srot are fed to the correction signal generating device 60. Based on this, the correction signal generating device 60 generates correction signals Idh, Iqh and feeds these into the control loop formed by the components 10, 20, 30, 40, 50, wherein this feed is realized by a superimposing device 70 ("addition node"), which in the example shown additively superimposes the correction signals Idh, Iqh on the control signals Idctl, Iqctl and is provided for this purpose at the input of the second transformation device 40.

The generation of the correction signals Idh, Iqh and their feed-in (feedback) into the control loop is designed in such a way that a desired noise reduction, defined by the control program and possibly dependent on an operating state of the electric motor or its installation environment, is achieved.

In the example, the following steps are carried out during the control program sequence to achieve noise reduction:

In a), an instantaneous rotational frequency f of the electric motor M is determined, for which, in the example shown, the control device 60 only needs to evaluate the time characteristic of the rotation signal Srot representing the rotational position φ of the electric motor M.

In b), by means of one or more bandpass filterings of the rotation signal Srot, one or more frequency components or, in the example shown, harmonic signals Srot-1, Srot-2, . . . are obtained, the frequencies of each of which correspond to a specified integer multiple N1xf, N2xf, . . . of the instantaneous rotational frequency f of the electric motor M and at the same time lie within a specified acoustic frequency range (here, e.g., 50 Hz-16 kHz).

In c), the correction signal Idh, Iqh is generated on the basis of the at least one harmonic signal Srot-1, Srot-2, . . . and fed into the control loop of the motor control, specifically in such a way that an amplitude of each of the harmonic signals Srot-1, Srot-2, . . . used for noise reduction is reduced and thus a corresponding noise reduction (with regard to the frequency components taken into account) is achieved.

In some embodiments, the number and/or the individual frequencies N1xf, N2xf, . . . of the harmonic signals used Srot-1, Srot-2, . . . are specified as a function of at least one predetermined operating parameter of the electric motor and/or the overall system (e.g., vehicle).

In some embodiments, the amplitude of each of the harmonic signals Srot-1, Srot-2, . . . used for noise reduction is reduced to a variably predeterminable noise reduction setpoint value, in particular, for example, controlled to such a setpoint value. Each noise reduction setpoint can be specified, for example, depending on at least one predetermined operating parameter of the electric motor and/or the overall system.

Figure 2:
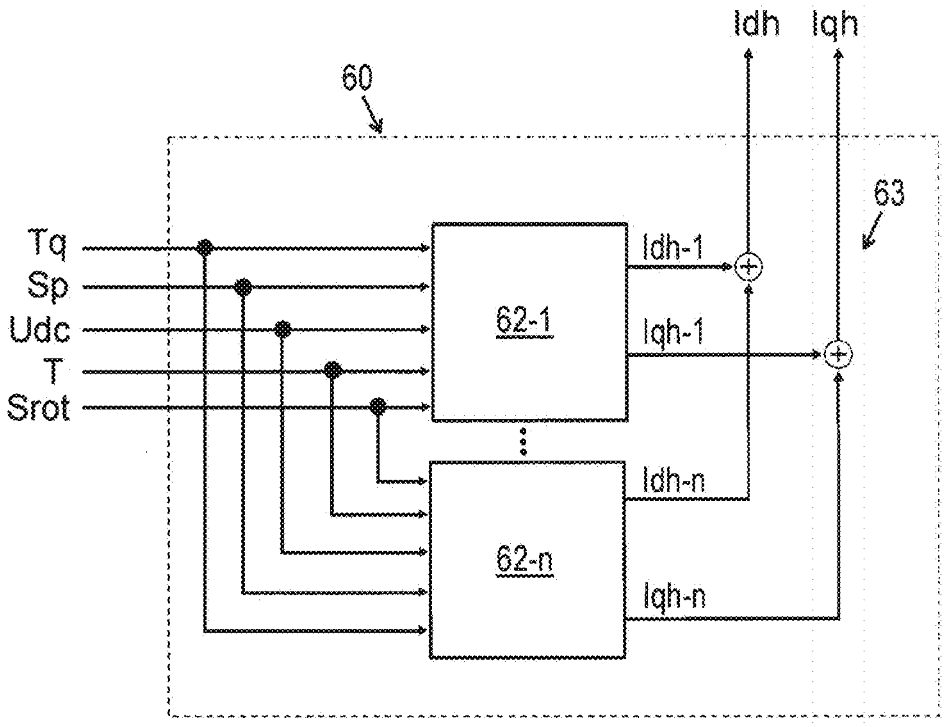
FIG. 2 shows a block diagram of a correction signal generating device in the motor control device of FIG. 1.

FIG. 2 shows a block diagram of an exemplary embodiment for the correction signal generating device 60 in the motor control device 1. The correction signal generating device 60 in the example of FIG. 2 has a certain number "n" of harmonic reduction units 62-1, . . . , **62-*n***, wherein this number "n" corresponds to the number of harmonic signals Srot-1, Srot-2, . . . , i.e., "Srot-1, . . . Srot-n" to be taken into account in the noise reduction.

At this juncture, it should be noted that the components of the correction signal generating device 60 shown in FIG. 2 are also realized or to be understood as components or functionalities of the corresponding software (control program), so that in particular, for example, the number "n" can easily vary during the execution of the noise reduction method, for example if "n" is to be specified depending on at least one operating parameter.

In the block diagram shown in FIG. 2, each of the harmonic reduction units 62-1, . . . , **62-*n*** serves, as it were, to accomplish the aforementioned steps a), b) and c) in relation to precisely one of the several "harmonics" in the example, i.e., to determine the instantaneous rotational frequency f of the electric motor M (step a), to filter the relevant harmonic signal Srot-1, . . . , Srot-n from the rotation signal Srot by means of bandpass filtering (cf. step b), and, based on the relevant harmonic signal Srot-1, Srot-2, . . . , to generate a relevant "correction signal component" Idh-1, Iqh-1; . . . ; Idh-n, Iqh-n.

However, the harmonic reduction units 62-1, . . . , **62-*n* differ in this respect with regard to the frequency or the "order" of the harmonic signals Srot-1, . . . , Srot-n processed in each case. It should also be noted here that, in particular when the correction signal generating device 60** is implemented by a computing device (e.g., comprising a microcontroller), as a component or functionality of the relevant software, the individual frequencies (orders of the harmonics) can vary during the execution of the noise reduction method, for example if these frequencies are specified as a function of at least one operating parameter or operating state.

The correction signal generating device 60 in FIG. 2 also has a superimposing device 63 ("addition node"), by means of which all correction signal components Idh-1, Iqh-1; . . . ; Idh-n, Iqh-n are additively superimposed and thus the resulting correction signal Idh, Iqh is generated (step c), which is fed into the control loop (FIG. 1) in the manner already described above.

Figure 3:
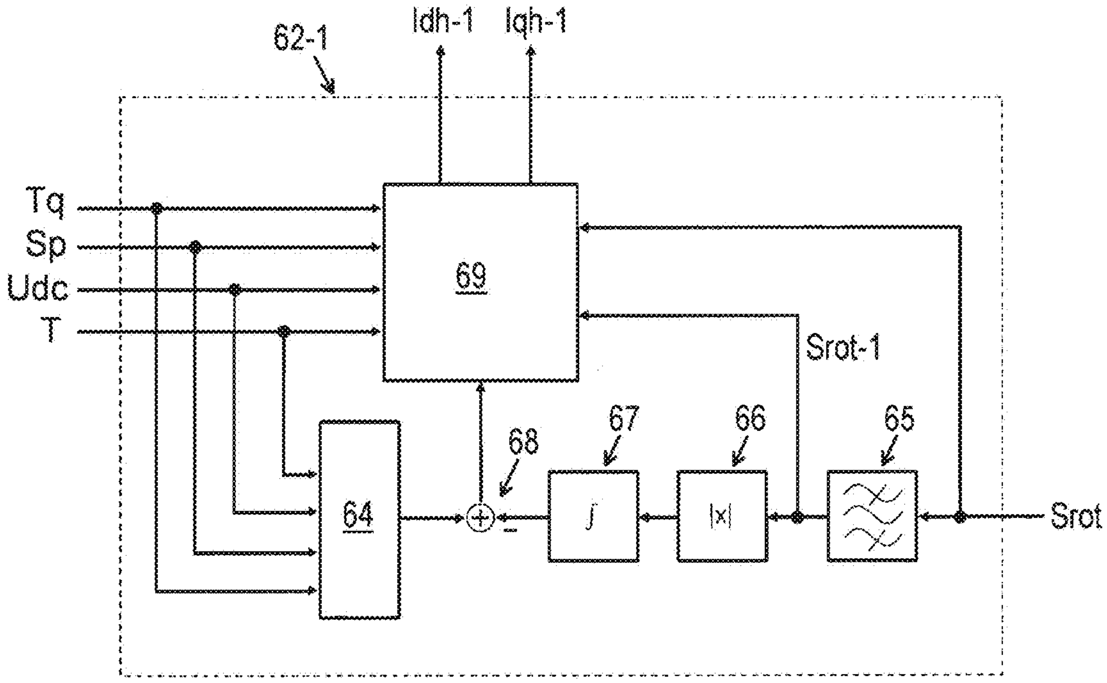
FIG. 3 shows a block diagram of a harmonic reduction unit in the correction signal generating device of FIG. 2.

FIG. 3 shows an exemplary block diagram illustrating the mode of operation of each of the harmonic reduction units 62-1, . . . , **62-*n* of the correction signal generating device 60 of FIG. 2 (which, as explained, have substantially the same structure or action). FIG. 3 shows the harmonic reduction unit "62-1**" as an example.

The harmonic reduction unit 62-1 in FIG. 3 has an amplitude presetting unit 63 which is implemented in software, for example as a "look-up table", and is used in the noise reduction method, based on an input of the values of Tq, Sp, Udc and T, to specify, as output, a setpoint value for an amplitude (reduced by the noise reduction) of the relevant harmonic signal "Srot-i" (with i=1, . . . , n, in the example: Srot-1).

The harmonic reduction unit 62-1 further comprises a bandpass filter 65 for bandpass filtering the rotation signal Srot in order to generate the relevant harmonic signal "Srot-i", in the example Srot-1, which is converted by means of a rectifier 66 and a downstream integrator 67 into a signal representative of the amplitude of the harmonic signal Srot-1. The latter signal (rectified and integrated) thus represents an actual value of the instantaneous amplitude of the harmonic signal Srot-1.

The harmonic reduction unit 62-1 also has an amplitude comparison device 68 ("subtraction node"), by means of which an actual value/setpoint comparison is carried out with regard to the amplitude of the harmonic signal Srot-1. A deviation signal resulting from the comparison is output to a correction signal generation unit 69 as shown in FIG. 3.

As shown in FIG. 3, the correction signal generation unit 69 generates, based on an input of the aforementioned deviation signal (regarding the amplitude of the harmonics), of the current values of Tq, Sp, Udc, T, of the rotation signal Srot (e.g., in "raw form"), and of the relevant harmonic signal, in this case Srot-1, as output, the relevant correction signal component, here Idh-1, Iqh-1, which is then superimposed with any other such correction signal components (relating to other harmonics) and thus fed into the control loop (cf. FIGS. 1 and 2).

With regard to the noise reduction method according to the invention, the correction signal generation unit 69 in the exemplary embodiment shown also implements, in particular, a determination device for determining the instantaneous rotational frequency f of the electric motor M from the rotation signal Srot representative of the rotational position p of the electric motor M. Furthermore, in the exemplary embodiment according to FIGS. 1 to 3, the acoustic frequency range is specified by the correction signal generation unit 69.

The relevant harmonic signal, here Srot-1, forms the basis for the correction signal generation unit 69 to generate the relevant correction signal component Idh-1, Iqh-1, to a certain extent as an "anti-sound" signal component (with the relevant harmonic frequency), in order to effect destructive interference in this respect.

In the example described here, the amplitude deviation signal is used by the correction signal generation unit 69 to control the actual amplitude of the harmonic signal Srot-1 to the associated target amplitude (if the actual value of the amplitude is greater than the target value, the amplitude of the relevant correction signal component can be increased, for example, and vice versa).

In the example, the instantaneous values of Tq, Sp, Udc, and T can be used by the correction signal generation unit 69, for example, to provide predetermined parameters or details of the generation of the correction signal component Idh-1, Iqh-1 depending on these values. Since in practice, depending on the electric motor, each of these variables can have a greater or lesser influence on the conversion or conversion efficiency of the signal Idh-1, Iqh-1 or the signal Idh, Iqh into a corresponding anti-sound (amplitude), such effects can be advantageously compensated for by taking one or more of these variables (such as Tq, Sp, Udc, T etc.) into account.

The rotation signal Srot (e.g., in raw form), or at least sufficiently time-resolved information about the rotational position of the rotor, is required in the example described (with vector control) by the correction signal generation unit 69 or correction signal generating device 60 in order to accomplish the mathematical transformation for representing the correction signal components or the correction signal Idh, Iqh formed therefrom in the "rotated" coordinate system.

Deviating from the described exemplary embodiment, in which only harmonics (Srot-1, Srot-2, . . . ) are taken into account as the "interference signals", the motor control device 1 or its software could easily be modified so that frequency components that are a non-integer multiple of the rotational frequency f of the electric motor M are also taken into account as an alternative or in addition.

What is claimed is:

1. A method for operating an electric motor using a motor control loop, the method comprising:

a) determining an instantaneous rotational frequency of the electric motor from a signal representing a rotational position and/or a rotational speed of the electric motor, wherein the rotation signal is generated by a rotation position sensor arranged on the electric motor;

b) filtering a frequency component from the signal, the frequency component corresponding to the instantaneous rotational frequency of the electric motor multiplied by a specified factor greater than 1 and lying within a specified acoustic frequency range;

c) generating a correction signal based on the filtered signal; and d) feeding the correction signal into the motor control loop to reduce an amplitude of the interference signal.

2. The method as claimed in claim 1, wherein the frequency of the interference signal corresponds to a respectively specified integer multiple of the instantaneous rotational frequency of the electric motor.

3. The method as claimed in claim 1, wherein the control variable sets a torque of the electric motor.

4. The method as claimed in claim 1, wherein the motor control comprises a field-oriented vector control including:

Clarke-Parks transformation of phase currents detected at the electric motor into the actual values of the control variables;

comparing the actual values of the control variables to the corresponding setpoint values of the respective control variables fed to the motor control;

generating control signals based on the result of the comparison of the stated actual values with the stated setpoint values;

Inverse Clarke transformation of the control signals into control signals in a stationary coordinate system;

space vector modulation based on the control signals in the stationary coordinate system to generate PWM phase current control signals for generating the phase currents to be transmitted to the electric motor; and wherein the correction signal is fed into the control loop so the control signals are corrected.

5. The method as claimed in claim 1, wherein a lower limit of the specified acoustic frequency range is at least 20 Hz and/or an upper limit of the specified acoustic frequency range is at most 20 KHz.

6. The method as claimed in claim 1, wherein a number of interference signals and/or the frequencies of the interference signals are specified as a function of an instantaneous operating parameter of the operation of the electric motor.

7. The method as claimed in claim 1, wherein the frequencies of the interference signals are each specified as at least 3 times, the instantaneous rotational frequency of the electric motor, and/or are each specified as at most 100 times, the instantaneous rotational frequency of the electric motor.

8. The method as claimed in claim 1, wherein the respective correction signal is generated based on the interference signal so the amplitude of the respective interference signal is reduced to a respective specified noise reduction setpoint.

9. The method as claimed in claim 8, wherein the noise reduction setpoint value is specified as a function of at least one instantaneous operating parameter of the operation of the electric motor.

10. A motor control device for controlling the operation of an electric motor using a noise reduction method, the device comprising:

a control circuit to control an actual value of a control variable setting a rotary drive of the electric motor to a corresponding setpoint value;

a sensor to determine an instantaneous rotational frequency of the electric motor from a signal representative of a rotational position and/or a rotational speed of the electric motor;

a filter to filter a frequency component from the rotation signal, the frequency of which corresponds to the instantaneous rotational frequency of the electric motor multiplied by a specified factor greater than 1 and lying within a specified acoustic frequency range; and a correction signal generating device to generate a correction signal based on the interference signal and to feed this correction signal into the control circuit to reduce an amplitude of the interference signal.

* * * * *